(12) United States Patent
Shuai (10) Patent No.: US 12,390,028 B1
(45) Date of Patent: Aug. 19, 2025

(54) MULTIFUNCTIONAL AND COMBINABLE PLANT STAND

(71) Applicant: Min Shuai, Ji'an (CN)

(72) Inventor: Min Shuai, Ji'an (CN)

(\*) Notice: Subject to any disclaimer, the term of this patent is extended or adjusted under 35 U.S.C. 154(b) by 0 days.

(21) Appl. No.: 19/094,999

(22) Filed: Mar. 30, 2025

(51) Int. Cl.
*A47G 7/04* (2006.01)
*A01G 7/04* (2006.01)

(52) U.S. Cl.
CPC .............. *A47G 7/041* (2013.01); *A01G 7/045* (2013.01)

(58) Field of Classification Search
CPC . A47G 7/02; A47G 7/04; A47G 7/041; A01G 5/04
See application file for complete search history.

(56) References Cited

U.S. PATENT DOCUMENTS

| | | | | |
|---|---|---|---|---|
| 1,897,905 A | * | 2/1933 | Johnson | A47G 7/041 248/163.1 |
| 4,039,132 A | * | 8/1977 | Fournier | A47G 7/041 D6/403 |
| 4,083,457 A | * | 4/1978 | Dromboski | A47G 7/04 248/311.2 |
| 4,270,463 A | * | 6/1981 | Korzon | A47B 57/26 108/147.11 |
| 4,691,832 A | * | 9/1987 | Steiger | A01G 9/023 211/186 |
| 2025/0151932 A1 | * | 5/2025 | Glen | A47G 7/041 |

FOREIGN PATENT DOCUMENTS

| | | |
|---|---|---|
| CN | 206149940 U | 5/2017 |
| CN | 215015823 U | 12/2021 |
| CN | 219812724 U | 10/2023 |

\* cited by examiner

*Primary Examiner* — Trinh T Nguyen
(74) *Attorney, Agent, or Firm* — Nitin Kaushik (57) ABSTRACT

This invention focuses on a multifunctional and combinable plant stand within the home greening technical field. It aims to address the limitations of traditional fixed-structured plant stands. Through a modular design, it can be freely combined into various forms. The stand consists of a combined frame body with vertical rods, horizontal rods, and plant grow lights. Rod connection mechanisms at the joints of vertical and horizontal rods enable flexible form adjustments. Supporting pot hooks and hook connection mechanisms on vertical rods, along with interlaced elastic support ropes inside the hooks, ensure stable placement of different-sized flowerpots. The plant grow lights with bendable tubes can provide illumination at different angles. The stand has multiple usage forms including basic, extended, and expanded forms, offering advantages such as flexible combination, space-saving, high stability, and aesthetic and practical value, meeting the display and support needs of diverse plants.

7 Claims, 10 Drawing Sheets

MULTIFUNCTIONAL AND COMBINABLE PLANT STAND

TECHNICAL FIELD

This invention pertains to the technical field of home greening, specifically presenting a multifunctional and combinable plant stand. This stand is designed to be freely adjustable in form according to user requirements and is highly suitable for the display and support of a wide variety of plants and flowers.

BACKGROUND

With the continuous acceleration of urbanization, residents' desires to beautify their living environments are growing day by day. Potted plant cultivation, a common beautification method, not only purifies the air but also enriches the natural ambiance and visual aesthetics of living spaces. Nevertheless, traditional plant stand designs mainly feature fixed structures. They are unable to be flexibly adjusted in line with the types, sizes, and growth demands of plants. As a result, the display effect and growth space of plants are restricted. The limitations of traditional plant stands are mainly manifested in the following aspects:
1. Fixed Structure: They cannot adapt to the growth requirements of plants, causing some plants to be unable to obtain the optimal growth space.
2. Single Function: These stands merely offer basic support functions and are incapable of meeting the display requirements of diverse plants.
3. Insufficient Aesthetics: Traditional plant stand designs are relatively simplistic and have difficulty in matching modern home environments.

Therefore, the present invention aims to provide a multifunctional combination plant stand that can be freely adjusted according to user requirements, meeting the display and support needs of different plants.

SUMMARY

The core purpose of this invention is to introduce a multifunctional and combinable plant stand. By adopting a modular design concept, it can be freely combined into multiple configurations. This enables it to fully meet the display and support requirements of different plants.

To achieve the above-mentioned objective, the technical solution employed in this invention is as follows: A multifunctional and combinable plant stand is mainly composed of a combined frame body. The combined frame body encompasses multiple vertical rods, horizontal rods, and plant grow lights. At the connection points of each vertical rod and horizontal rod, a rod connection mechanism is installed. Through this rod connection mechanism, the vertical rods and horizontal rods can be combined into various forms. On the outer part of each vertical rod, a supporting pot hook and a hook connection mechanism are slidably arranged. Inside each supporting pot hook, two interlaced and stacked elastic support ropes are provided. The combined frame body can be configured into multiple usage forms.

Preferably, the rod connection mechanism contains a rod connection block. On the outer surface of the rod connection block, two rod through-holes, a hand-tightened bolt through-hole, and a telescopic slit are formed. This rod connection mechanism allows for the flexible adjustment of the positions of the vertical and horizontal rods.

Preferably, the hook connection mechanism consists of a hook connection block with two outer-opening holes formed inside. Bolt rods are threadedly connected to the outer surfaces of these two outer-opening holes. Hand-tightened plates are firmly fixed to the ends of the two bolt rods, and rubber sleeve heads are sleeved on the other ends of the bolt rods. The hook connection mechanism guarantees the stability of the supporting pot hook.

Preferably, the plant light is composed of an illuminating lamp and a lamp holder. The lamp holder is installed at the top of the vertical rod, and a bendable tube is set between the lamp holder and the illuminating lamp. This bendable tube can freely change directions in all aspects (up, down, front, back, left, and right). The plant light installed at the top of the vertical rod can offer necessary illumination for plants from different angles, thereby enhancing their ornamental value.

Preferably, the combined frame body can be combined into the following multiple forms:
1. Basic Form: Composed of four vertical rods, six horizontal rods, twelve rod connection mechanisms, nine supporting pot hooks, nine hook connection mechanisms, and one plant light. It is suitable for placement in any location at home, allowing users to view plants from multiple perspectives.
2. Extended Form: Based on the basic form, the upper horizontal rods can be adjusted vertically up and down. This enables the hanging of hanging-basket-type flowerpots, increasing the variety of plants that the stand can support. Simultaneously, the vertical up-and-down adjustment of the horizontal rods caters to the needs of customers of different heights. The horizontal movement of the vertical rods can partition the vertical space, which is beneficial for the zoned placement of flowers and plants, enhancing the decorative aesthetic function.
3. Expanded Form: The expanded form can be formed by connecting and combining two or more basic forms at different parts. For instance, a combination of two basic forms consists of eight vertical rods, twelve horizontal rods, twenty-six rod connection mechanisms, sixteen supporting pot hooks, eighteen hook connection mechanisms, and two plant grow lights. The middle area can be utilized for planar display, which is suitable for presenting precious plants. The expanded form can make the entire stand resemble a plant wall or a plant-style screen, enhancing the aesthetic perception when people are in front of the screen-like plant arrangement.

Advantages
1. Flexible Combination: Through the coordinated operation of vertical rods, horizontal rods, rod connection mechanisms, supporting pot hooks, and hook connection mechanisms, it can be freely assembled into multiple forms to meet the display requirements of different plants.
2. Space-Saving: The extended part of the horizontal rod can be used to hang hanging-basket-type flowerpots, which not only saves space but also improves the overall aesthetic appearance.
3. High Stability: The two interlaced and stacked support ropes inside the supporting pot hook can stably support flowerpots of different sizes and prevent them from slipping.
4. Aesthetic and Practical: The plant light can provide essential illumination for plants, enhancing the layering and color expression of plants and improving their ornamental value.

In the figures: 1, combined frame body; 2, vertical rod; 3, horizontal rod; 4, rod connection mechanism; 401, rod connection block; 402, rod through-hole; 403, hand-tightened bolt through-hole; 404, telescopic slit; 5, supporting pot hook; 6, hook connection mechanism; 601, hook connection block; 602, outer-opening hole; 603, bolt rod; 604, hand-tightened plate; 605, rubber sleeve head; 7, support rope; 8, plant light; 801, illuminating lamp; 802, bendable tube; 803, lamp holder.

DETAILED DESCRIPTION OF THE EMBODIMENTS

The embodiments of this invention will be elaborated in detail with reference to the accompanying drawings. It should be understood by those skilled in the art that these embodiments are solely used to illustrate the technical principles of this invention and are not intended to limit the protection scope of this invention. The specific implementation of this invention will be described in detail through the following specific embodiments.

Embodiment 1

As shown in FIG. 1, FIG. 8, FIG. 9, and FIG. 10, the basic form of the multifunctional and combinable plant stand includes a combined frame body (1). The combined frame body (1) is composed of multiple vertical rods (2), multiple horizontal rods (3), and a plant light (8). The combined frame body (1) has multiple usage scenarios. A rod connection mechanism (4) is arranged at the connection of each vertical rod (2) and horizontal rod (3). Using this rod connection mechanism (4), the vertical rods (2) and horizontal rods (3) can be combined into different configurations. The rod connection mechanism (4) contains a rod connection block (401). On the outer surface of the rod connection block (401), two rod through-holes (402), a hand-tightened bolt through-hole (403), and a telescopic slit (404) are formed. The rod through-holes (402) are designed for the vertical rod (2) and horizontal rod (3) to pass through, allowing for self-adjustment of the positions of the vertical rod (2) and horizontal rod (3). Different forms can be altered according to the indoor or courtyard space of users. The setting of the telescopic slit (404) can endow the rod through-hole (402) with certain telescopic capabilities. A hand-tightened bolt can pass through the hand-tightened bolt through-hole (403) and be threadedly connected to the inner sidewall of the telescopic slit (404). By squeezing the rod connection block (401) with the bolt, the slit of the hand-tightened bolt through-hole (403) can be contracted, enabling the rod connection block (401) to be firmly connected to the vertical rod (2) or horizontal rod (3). The rod connection mechanism (4) allows for the free combination of the positions of the vertical rod (2) and horizontal rod (3). The vertically surplus space of the vertical rod (2) or the horizontally surplus space of the horizontal rod (3) can be utilized to hang hanging-basket-type flowerpots. Hanging hanging-basket-type flowerpots on the rod is a mature existing technology well-known to those skilled in this technical field.

Figure 1:
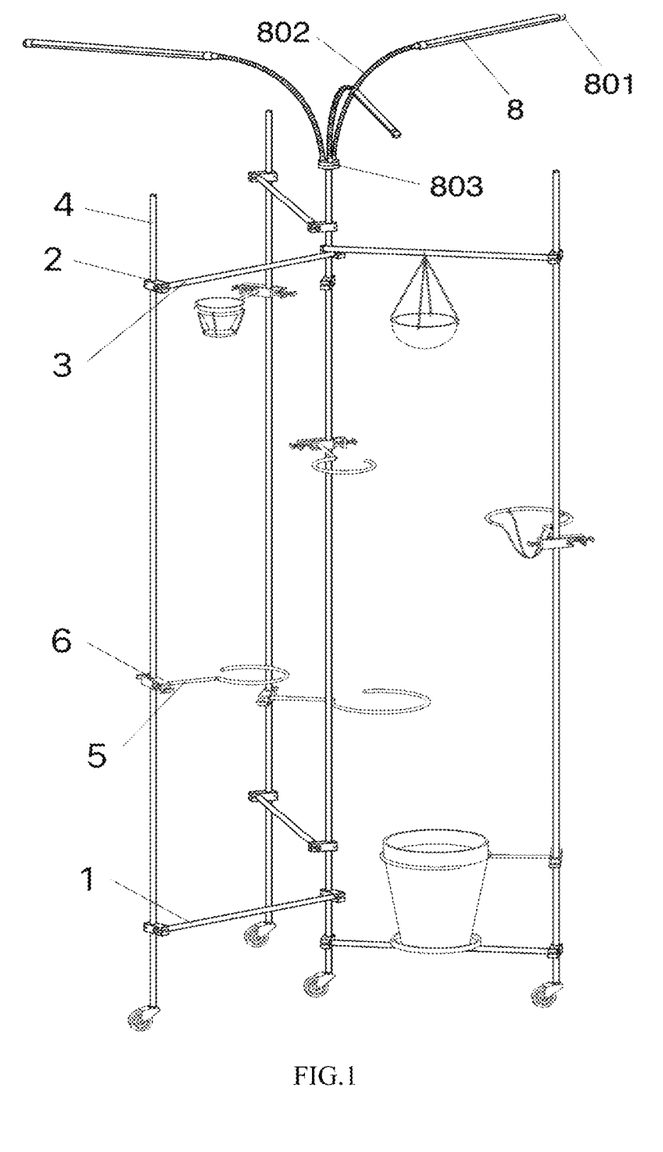
FIG. 1 is a three-dimensional structure diagram of the basic form of the first form of this invention.
Figure 8:
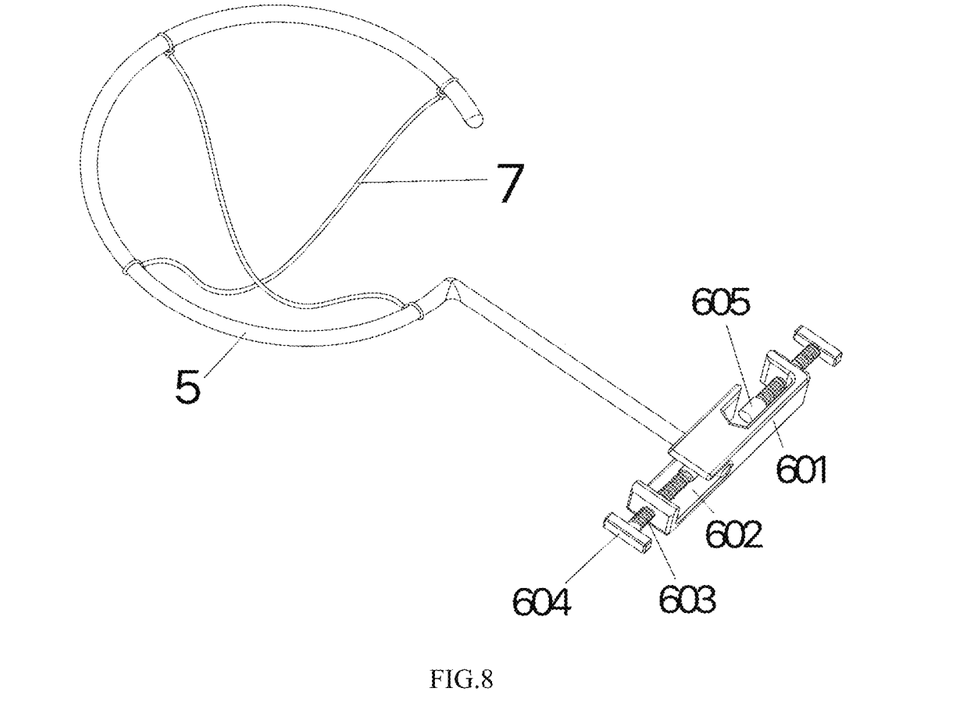
FIG. 8 is a three-dimensional structure diagram of the supporting pot hook, hook connection mechanism, and support rope of this invention.
Figure 9:
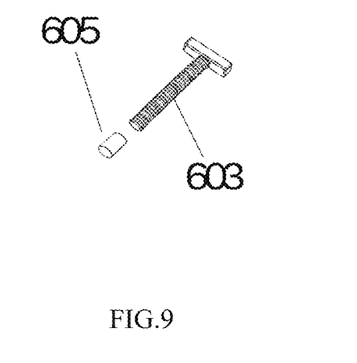
FIG. 9 is a three-dimensional structure diagram of the bolt rod and rubber sleeve head of this invention.
Figure 10:
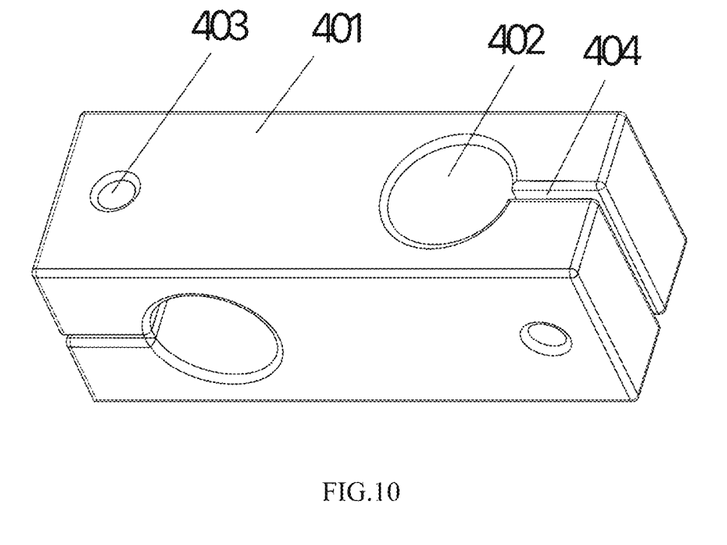
FIG. 10 is a three-dimensional structure diagram of the rod connection mechanism of this invention.

A supporting pot hook (5) and a hook connection mechanism (6) are slidably installed on the outer part of each vertical rod (2). The supporting pot hook (5) can hold flowerpots of different sizes. The main principle is that the main shape of a flowerpot is smaller at the bottom and larger at the top. Thus, the supporting pot hook (5) can hold different cross-sectional positions of different flowerpots, demonstrating strong applicability. The hook connection mechanism (6) consists of a hook connection block (601) with two outer-opening holes (602) formed inside. Bolt rods (603) are threadedly connected to the outer surfaces of the two outer-opening holes (602). Threaded holes are formed on the outer surface of the supporting pot hook (5) to facilitate the insertion of the bolt rods (603) for fixing the supporting pot hook (5). Hand-tightened plates (604) are fixedly connected to the ends of the two bolt rods (603). By using the hand-tightened plates (604), it is convenient to screw the bolt rods (603), providing convenience for users. Rubber sleeve heads (605) are sleeved on the other ends of the bolt rods (603). The rubber sleeve heads (605) can enhance the stability of the connection with the supporting pot hook (5), prevent the hook from detaching, and avoid scratching the supporting pot hook (5) and the vertical rod (2), preventing damage between components.

Two interlaced and stacked elastic support ropes 7 are provided inside each supporting pot hook (5). The elastic support ropes 7 not only enhance the structural stability but also play a better role in supporting flowerpot pads. Due to the elastic nature of the rubber-like material, they can stably hold flowerpot pads of different sizes and effectively prevent small-sized ones from slipping.

A universal wheel with a self-locking function is installed at the bottom end of each vertical rod (2), facilitating users to move the combined frame body (1).

The plant light (8) includes an illuminating lamp (801) and a lamp holder (803). The lamp holder (803) is installed at the top of the vertical rod (2), and a bendable tube (802) is provided between the lamp holder (803) and the illuminating lamp (801). The lamp holder (803) and the illuminating lamp (801) are connected through the bendable tube (802). The bendable tube (802) can freely change directions, improving the flexibility of illumination. The plant light not only provides necessary illumination for plants but also enhances the layering and color expression of plants visually, greatly improving the ornamental value of plants and enhancing the indoor atmosphere.

Figure 2:
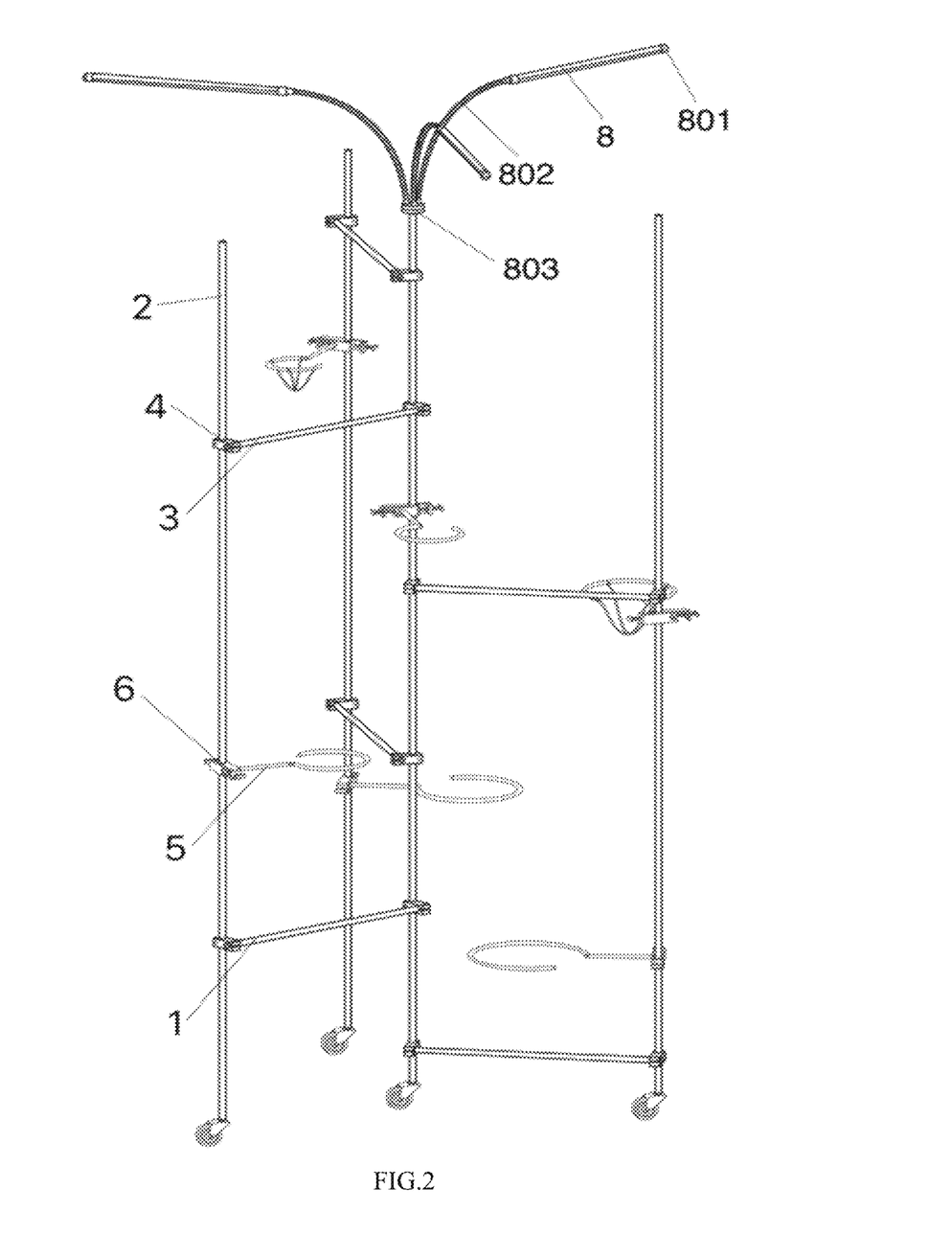
FIG. 2 is a three-dimensional structure diagram of the adjustment of the horizontal rod in the extended form of this invention.
Figure 3:
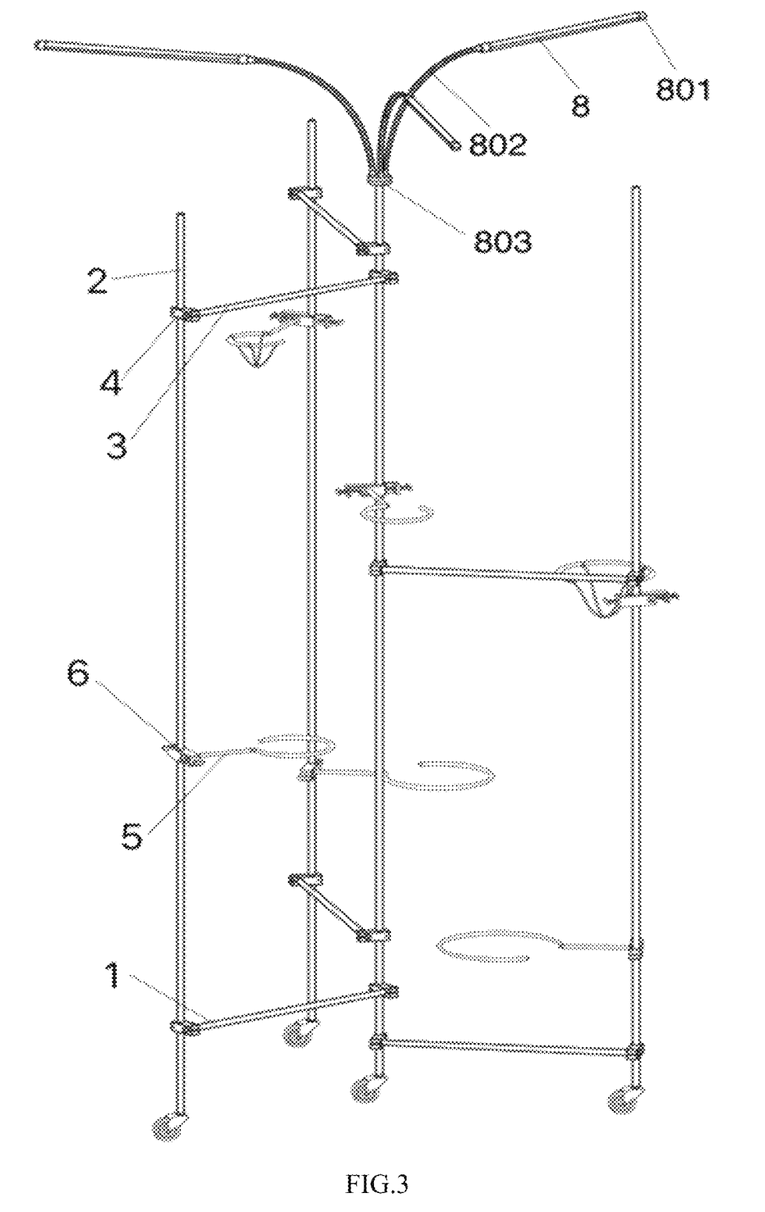
FIG. 3 is a three-dimensional structure diagram of another adjustment of the horizontal rod in the extended form of this invention.

The first form of the combined frame body (1) is composed of four vertical rods (2), six horizontal rods (3), twelve rod connection mechanisms (4), nine supporting pot hooks (5), nine hook connection mechanisms (6), and one plant light (8). This form is the basic form of the combined frame body (1), with the advantages of allowing multi-directional viewing of the flowers on each flowerpot without interference between them, and the combined frame body (1) is relatively stable when standing. It is suitable for placement in the center of a garden or balcony. Users can view the flowers from multiple directions. In addition, as shown in FIG. 2 and FIG. 3, changing the positions of the horizontal rods can make the placement of flowerpots more flexible, giving users strong DIY capabilities. Users can adjust the layout and style of flowerpots according to their preferences and creativity, adding a personalized touch to the home or space and meeting users' dual pursuits of beautification and personalization.

Embodiment 2

Figure 4:
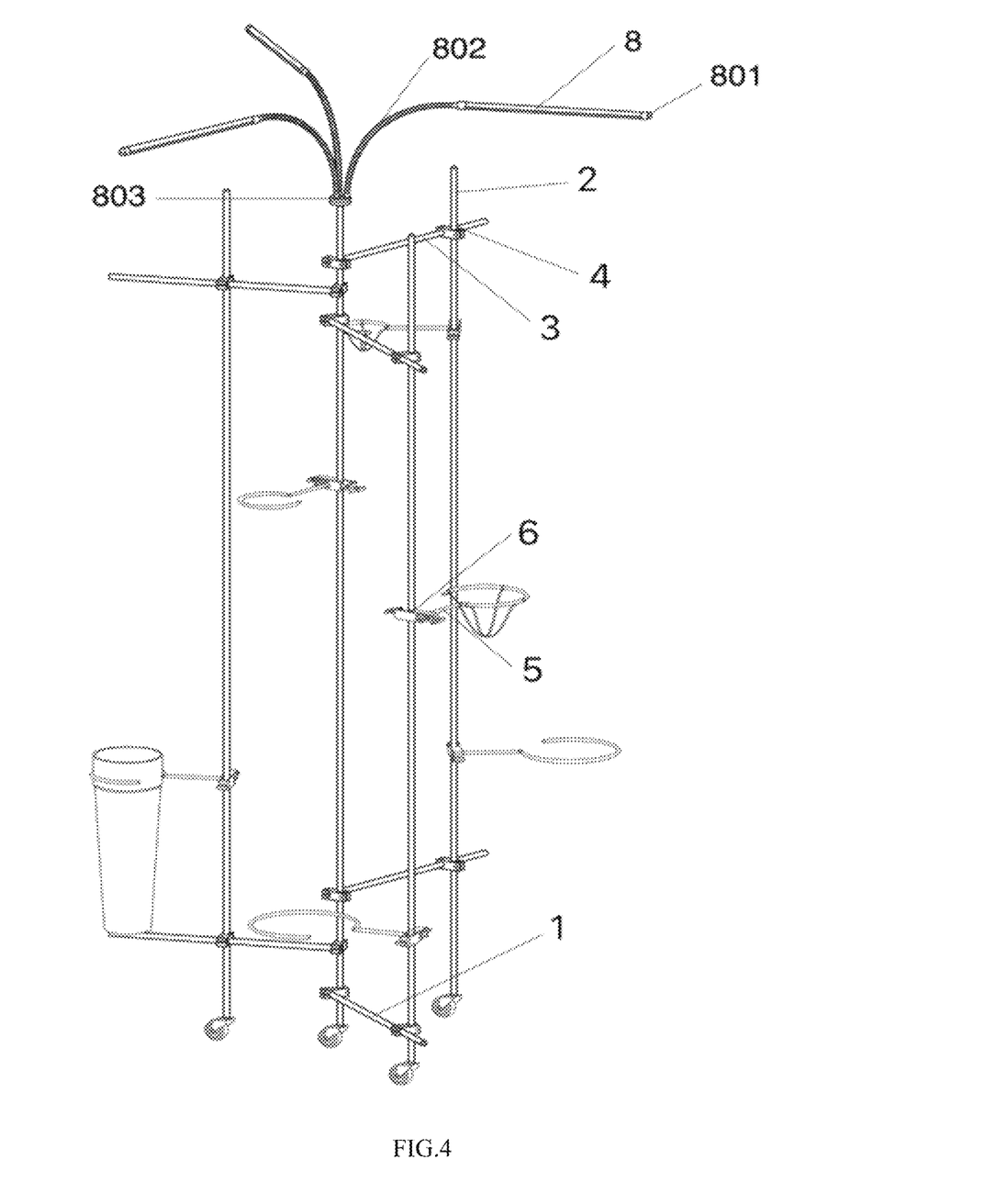
FIG. 4 is a three-dimensional structure diagram of the adjustment of the vertical rod in the extended form of this invention.
Figure 5:
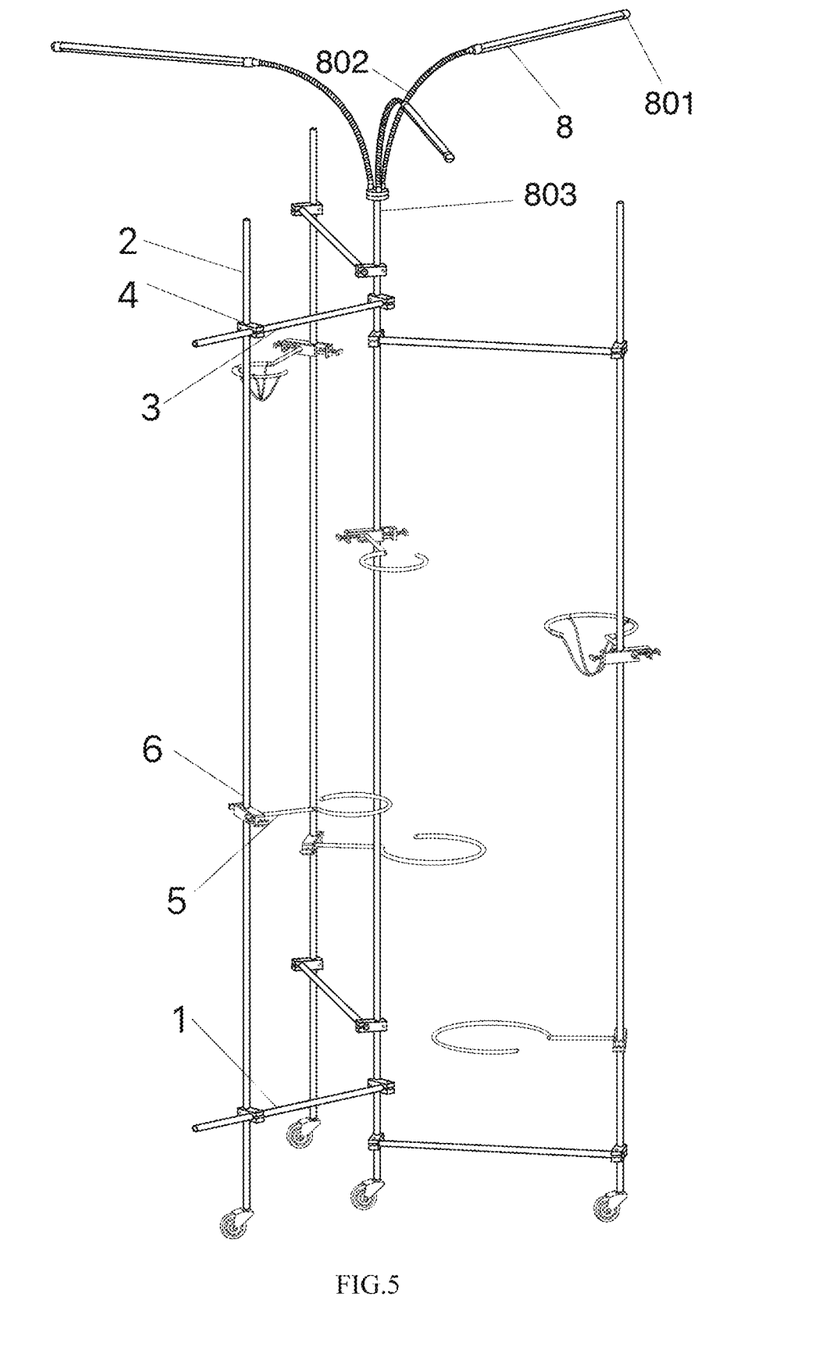
FIG. 5 is a three-dimensional structure diagram of another adjustment of the vertical rod in the extended form of this invention.

As shown in FIG. 2, FIG. 3, FIG. 4, and FIG. 5, it is the extended form of the basic form. The second form of the combined frame body (1) is composed of four vertical rods (2), six horizontal rods (3), twelve rod connection mechanisms (4), nine supporting pot hooks (5), nine hook connection mechanisms (6), and one plant light (8). In this form, based on the basic form, the horizontal rod 3 and the vertical rod (2) can be moved. The horizontal rod (3) can move vertically up and down to allocate space to meet the growth space requirements of different-sized plants. At the same time, based on the basic form, the vertical rod (2) can be moved horizontally to divide the vertical space. The horizontal rod (3) can also be divided into two parts. The upper protruding horizontal rod can be used to hang hanging-basket-type plants, and the lower extra horizontal rod can be used to place flower cylinders. As shown in FIG. 4, by changing the position of the vertical rod, the dense layout of the upper and lower ends of the flowerpots can be flexibly changed, allowing the flowers to show diverse styles. Whether it is a dense or sparse layout, it can present a unique aesthetic feeling, adding unlimited possibilities to potted plant decoration and making the flowers more gorgeous.

Embodiment 3

Figure 6:
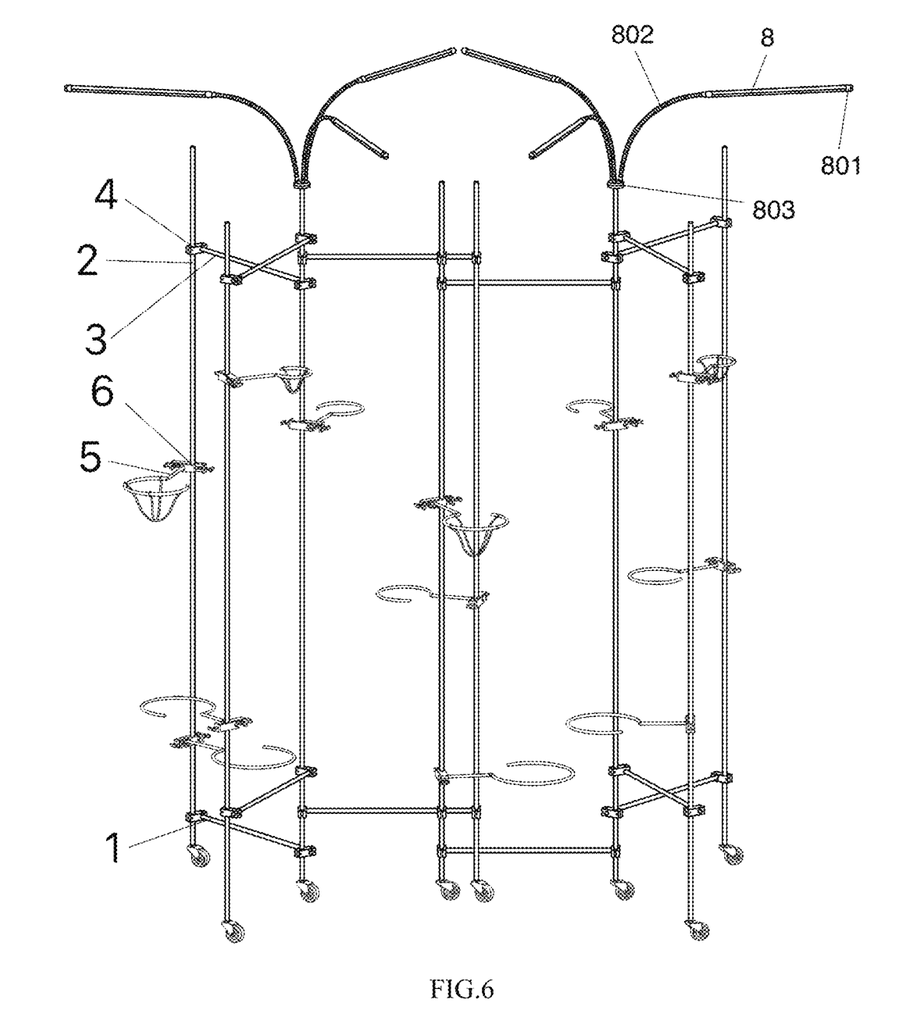
FIG. 6 is a three-dimensional structure diagram of the first form of the combined frame body in the expanded form of this invention.
Figure 7:
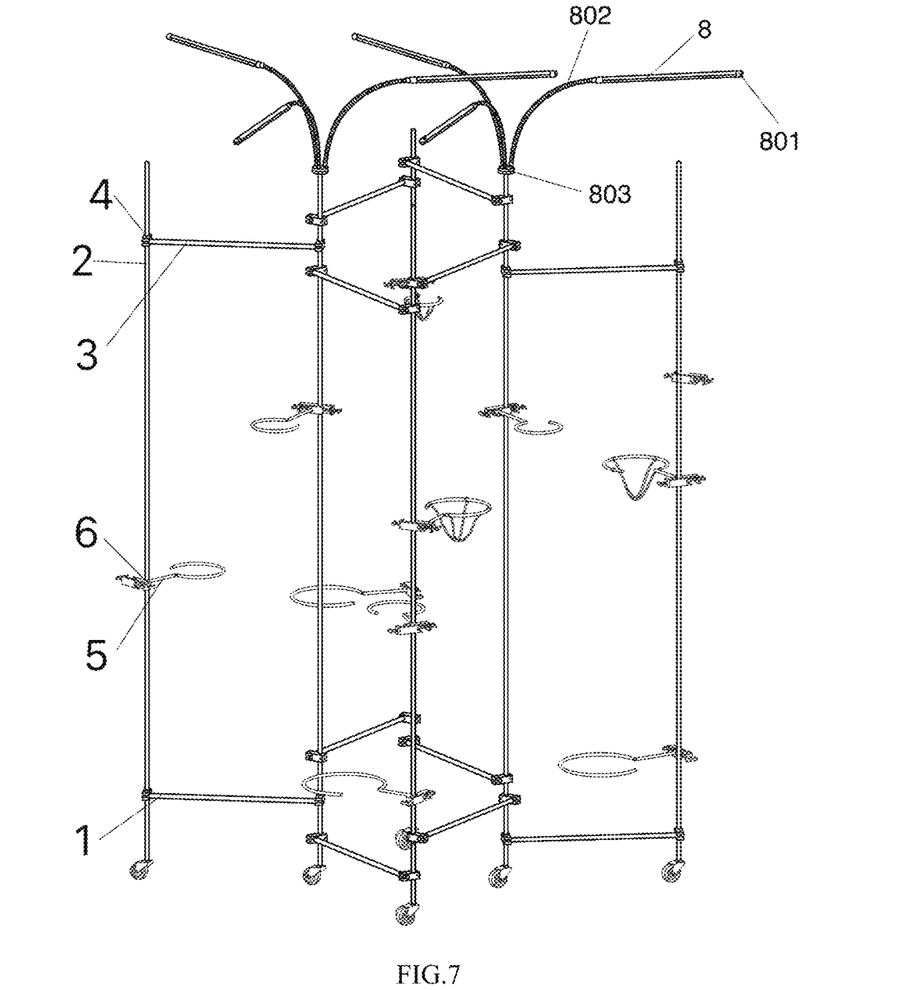
FIG. 7 is a three-dimensional structure diagram of the second form of the combined frame body in the expanded form of this invention.

As shown in FIG. 6 and FIG. 7, the expanded form of the basic form of the combined frame body (1) is composed of eight vertical rods (2), twelve horizontal rods (3), twenty-six rod connection mechanisms (4), sixteen supporting pot hooks (5), eighteen hook connection mechanisms (6), and two plant grow lights (8). Compared with the first form, this form uses more combined components, enabling it to carry more plants. As shown in FIG. 6, when filled with plants, it resembles a plant wall and can be placed along the wall. As shown in FIG. 7, when filled with plants, it resembles a plant screen or a movable plant painting. The remarkable feature of this form is its unique layout, which fully showcases its charm and improves the overall indoor atmosphere.

It should be noted that in the description of this invention, terms indicating directions or positional relationships such as "center", "upper", "lower", "left", "right", "vertical", "horizontal", "inner", and "outer" are based on the directions or positional relationships shown in the drawings. This is only for the convenience of description and does not indicate or imply that the device or element must have a specific orientation, be constructed, and operate in a specific orientation. Therefore, it should not be construed as a limitation of this invention. In addition, terms such as "first", "second", and "third" are only used for descriptive purposes and should not be construed as indicating or implying relative importance.

In addition, it should also be noted that in the description of this invention, unless otherwise clearly specified and limited, terms such as "installation", "connection", and "connection" should be understood in a broad sense. For example, it can be a fixed connection, a detachable connection, or an integral connection; it can be a mechanical connection or an electrical connection; it can be a direct connection or an indirect connection through an intermediate medium, and it can be the internal communication of two elements. For those skilled in the art, the specific meanings of the above-mentioned terms in this invention can be understood according to specific situations.

So far, the technical solution of this invention has been described in combination with the preferred embodiments shown in the drawings. However, it is easily understood by those skilled in the art that the protection scope of this invention is obviously not limited to these specific embodiments. Without departing from the principles of this invention, those skilled in the art can make equivalent changes or substitutions to the relevant technical features, and the technical solutions after these changes or substitutions will fall within the protection scope of this invention

What is claimed is:

1. A Multifunctional And Combinable plant stand, comprising a combined frame body (1), wherein the combined frame body (1) comprises a plurality of vertical rods (2), horizontal rods (3) and plant lights (8);
   There is a rod connection mechanism (4) provided at the connection of each vertical rod (2) and horizontal rod (3), and the vertical rods (2) and horizontal rods (3) can be combined into different configurations by using the rod connection mechanism (4);
   A supporting pot hook (5) and a hook connection mechanism (6) for cooperative use are slidably arranged on the outer part of each vertical rod (2);
   Two interlaced and stacked elastic support ropes (7) are provided inside each supporting pot hook (5);
   The combined frame body (1) has multiple usage configurations; wherein a first configuration of the combined frame body (1) is composed of four vertical rods (2), six horizontal rods (3), twelve rod connection mechanisms (4), nine supporting pot hooks (5), nine hook connection mechanisms (6) and one plant light (8), and this configuration is the basic configuration of the combined frame body (1).

2. The Multifunctional And Combinable plant stand according to claim 1, wherein the rod connection mechanism (4) comprises a rod connection block (401), and two rod through-holes (402), a hand-tightened bolt through-hole (403) and a telescopic slit (404) are formed on the outer surface of the rod connection block (401).

3. The Multifunctional And Combinable plant stand according to claim 1, wherein the hook connection mechanism (6) comprises a hook connection block (601), and two outer-opening holes (602) are formed inside the hook connection block (601).

4. The Multifunctional And Combinable plant stand according to claim 3, wherein bolt rods (603) are threadedly connected to the outer surfaces of the two outer-opening holes (602), hand-tightened plates (604) are fixedly connected to the ends of the two bolt rods (603), and rubber sleeve heads (605) are sleeved on the other ends of the bolt rods (603).

5. The Multifunctional And Combinable plant stand according to claim 1, wherein the plant light (8) comprises an illuminating lamp (801) and a lamp holder (803), the lamp holder (803) is installed at the top of the vertical rod (2), a bendable tube (802) is provided between the lamp holder (803) and the illuminating lamp (801), and the bendable tube (802) can change directions freely in all directions (up, down, front, back, left and right).

6. The Multifunctional And Combinable plant stand according to claim 1, wherein the second configuration of the combined frame body (1) is composed of four vertical rods (2), six horizontal rods (3), twelve rod connection mechanisms (4), nine supporting pot hooks (5), nine hook connection mechanisms (6) and one plant light (8), and this configuration is an extended configuration of the first configuration, and different spaces are separated by adjusting the positions of the vertical rods (2) and horizontal rods (3).

7. The Multifunctional And Combinable plant stand according to claim 1, wherein the third configuration of the combined frame body (1) is composed of eight vertical rods (2), twelve horizontal rods (3), twenty-six rod connection mechanisms (4), sixteen supporting pot hooks (5), eighteen hook connection mechanisms (6) and two plant lights (8), and this configuration is an expanded configuration of the first configuration, which is formed by splicing two basic configurations, and different expanded-configuration effects can be spliced due to different splicing parts.

* * * * *